(12) United States Patent
Li et al.

(10) Patent No.: US 12,117,689 B1
(45) Date of Patent: Oct. 15, 2024

(54) POLARIZERS AND LIQUID CRYSTAL DISPLAY DEVICES

(71) Applicant: TCL CHINA STAR OPTOELECTRONICS TECHNOLOGY CO., LTD., Guangdong (CN)

(72) Inventors: Ji Li, Guangdong (CN); Hanming Li, Guangdong (CN); Guang Zeng, Guangdong (CN); Fang Tan, Guangdong (CN); Hongshan Yin, Guangdong (CN); Kai Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/263,208

(22) PCT Filed: Jun. 21, 2023

(86) PCT No.: PCT/CN2023/101709
§ 371 (c)(1),
(2) Date: Jan. 21, 2024

(30) Foreign Application Priority Data

Apr. 13, 2023 (CN) .......................... 202310394580.6

(51) Int. Cl.
*G02F 1/1335* (2006.01)
*G02B 5/30* (2006.01)

(52) U.S. Cl.
CPC ..... *G02F 1/133531* (2021.01); *G02B 5/3008* (2013.01); *G02F 2202/022* (2013.01)

(58) Field of Classification Search
CPC ......... G02F 1/133531; G02F 2202/022; G02B 5/3008
USPC .................................................. 349/96–103
See application file for complete search history.

(56) References Cited

U.S. PATENT DOCUMENTS

| | | | |
|---|---|---|---|
| 2007/0030417 A1* | 2/2007 | Kubo | .............. B29C 55/06 349/96 |
| 2020/0257166 A1 | 8/2020 | Smith et al. | |
| 2021/0050393 A1 | 2/2021 | Smith et al. | |

FOREIGN PATENT DOCUMENTS

| | | |
|---|---|---|
| CN | 1965251 A | 5/2007 |
| CN | 102127249 A | 7/2011 |
| CN | 105190412 A | 12/2015 |
| CN | 111443403 A | 7/2020 |
| CN | 114660853 A | 6/2022 |
| CN | 115685429 A | 2/2023 |
| CN | 116107012 A | 5/2023 |
| CN | 116125582 A | 5/2023 |

(Continued)

OTHER PUBLICATIONS

Chinese Office Action issued in corresponding Chinese Patent Application No. 202310394580.6 dated May 22, 2023, pp. 1-8.

(Continued)

*Primary Examiner* — Charles S Chang
(74) *Attorney, Agent, or Firm* — PV IP PC; Wei Te Chung

(57) ABSTRACT

The present application provides a polarizer and a liquid crystal display device. The polarizer includes a resin layer, the resin layer includes a whisker, an acute angle is formed by a long-axis direction of each of the whiskers and a bottom surface of the resin layer, and the acute angle is greater than 0° and less than or equal to 40°.

20 Claims, 13 Drawing Sheets

(56) References Cited

FOREIGN PATENT DOCUMENTS

| JP | H11194204 | A | 7/1999 |
| JP | 2001225349 | A | 8/2001 |
| JP | 2003156624 | A | 5/2003 |
| JP | 2008158462 | A | 7/2008 |
| JP | 2011150760 | A | 8/2011 |
| JP | 2017014329 | A | 1/2017 |
| KR | 20200067586 | A | 6/2020 |
| TW | 200700475 | A | 1/2007 |
| TW | 202305423 | A | 2/2023 |
| WO | 2018139641 | A1 | 8/2018 |

OTHER PUBLICATIONS

International Search Report in International application No. PCT/CN2023/101709, mailed on Jan. 5, 2024.
Written Opinion of the International Search Authority in International application No. PCT/CN2023/101709, mailed on Jan. 5, 2024.
Korean Office Action issued in corresponding Korean Patent Application No. 10-2023-7028981 dated Jan. 17, 2024, pp. 1-3.
CNIPA, Notification of First Office Action for Chinese application CN202310394580.6, May 22, 2023.
CNIPA, Notification to grant patent right for Chinese application CN202310394580.6, Jun. 8, 2023.
TCL China Star Optoelectronics Technology Co., Ltd. (Applicant), Allowed claims of Chinese application CN202310394580.6.

* cited by examiner

POLARIZERS AND LIQUID CRYSTAL DISPLAY DEVICES

CROSS-REFERENCE TO RELATED APPLICATIONS

This application is a national phase application of International Application No. PCT/CN2023/101709 field on Jun. 21, 2023, which claims priority to and the benefit of Chinese Patent Application No. 202310394580.6, filed on Apr. 13, 2023. The contents of the aforementioned applications are incorporated herein by reference in their entireties.

TECHNICAL FIELD

The present application relates to display technologies, and more particularly, to polarizers and liquid crystal display devices.

BACKGROUND

In a current polarizer, whiskers are dispersed in film layers of the polarizer, thereby enhancing a viewing angle of the polarizer.

However, in such a polarizer, performance on the viewing angle of the polarizer is expected to be further improved.

Technical Problem

In view of above, the present application provides polarizers and liquid crystal display devices of which the performance on the viewing angle is improved.

Technical Solutions

The present application provides a polarizer including a resin layer, the resin layer includes whiskers, an acute angle is formed by a long-axis direction of each of the whiskers and a bottom surface of the resin layer, and the acute angle is greater than 0° and less than or equal to 40°.

In one embodiment, the acute angle is less than or equal to 20°.

In one embodiment, the whiskers include a first particle and a second particle, the first particle has a diameter constant in a length direction of the first particle, the second particle includes a first end portion and a second end portion arranged in a length direction of the second particle, and the first end portion has a diameter that decreases with an increasing distance from the second end portion in the length direction of the second particle.

In one embodiment, a diameter of the second particle decreases in a direction from the second end portion toward the first end portion.

In one embodiment, the second end portion has a diameter that decreases with an increasing distance from the first end portion in the length direction of the second particle.

In one embodiment, the second particle further includes an intermediate portion, and the first end portion, the intermediate portion, and the second end portion are connected in sequence;

the intermediate portion has a diameter constant in the length direction of the second particle, and the second end portion has a diameter that decreases or constant with an increasing distance from the first end portion in the length direction of the second particle.

In one embodiment, a ratio of a sum of masses of the first particles and the second particles to mass of the resin layer is 10%;

the second particles include first-type particles and second-type particles, each of the first-type particles and the second-type particles includes a first end portion and a second end portion arranged in a length direction thereof;

a diameter of each of the first-type particles decreases in a direction from the second end portion of the first-type particle toward the first end portion of the first-type particle;

a diameter of the second end portion of the second-type particles decreases with an increasing distance from the first end portion of the second-type particles in the length direction of the second-type particles; and a ratio of mass of all the first particles, mass of all the first-type particles, and mass of all the second-type particles is (1 to 10):(40 to 70):(20 to 60).

In one embodiment, the resin layer further includes a first polymer, the whiskers are dispersed in the first polymer, a second polymer is attached to a surface of each of the whiskers, and the first polymer is a lipophilic polymer and the second polymer is a lipophilic polymer.

In one embodiment, the second polymer includes a same group as the first polymer, or the second polymer includes a same group as a homologue of the first polymer; and/or the second polymer includes at least one of at least one of polyacrylate group, acrylate-acrylic acid copolymer group, polycarboxylic acid-type water-soluble comb copolymer group, or polydimethylsiloxane group.

The present application also provides a liquid crystal display device including the polarizer as described above.

Beneficial Effects

In the polarizer according to an embodiment of the present application, since the length of the whisker is unchanged, the amount of the light scattered by the whisker is unchanged. The amount of light scattered by the whisker may be divided into a component of the scattered light in a direction parallel to the bottom surface of the resin layer (referred to as a left-right component for short) and a component of the scattered light in a direction perpendicular to the bottom surface of the resin layer (referred to as upper-lower component for short). If the left-right component is larger, the up-down component is lesser. The smaller the angle formed by the whisker and the resin layer, the larger the left-right component (i.e., the larger the projection of the whisker on the resin layer), the stronger the left-right scattering, the better the left-right viewing angle performance, and vice versa. The present application improves the viewing angle performance of the polarizer by setting the acute angle formed by the long-axis direction of the whisker and the bottom surface of the resin layer to be greater than 0° and less than or equal to 40°.

BRIEF DESCRIPTION OF THE DRAWINGS

In order to explain technical solutions in embodiments of the present application more clearly, the accompanying drawings required for the description of the implementations are briefly described. It will be apparent that the accompanying drawings in the following description are merely some of the implementations of the present application, and other

DETAILED DESCRIPTION

Technical solutions of embodiments of the present application will be clearly and completely described with reference to the accompanying drawings in the embodiments of the present application: Apparently, the described embodiments are only a part of the embodiments of the present application, and not all embodiments. Based on the embodiments in the present application, all other embodiments obtained by a person skilled in the art without involving any inventive effort fall within the scope of the present application.

In the present disclosure, unless otherwise clearly defined and limited, a first feature "on" or "under" a second feature may mean that the first feature directly contacts the second feature, or that the first feature contacts the second feature via an additional feature therebetween instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that the horizontal height of the first feature is lower than that of the second feature. Furthermore, the terms "first", and "second" are for illustrative purposes only and are not to be construed as indicating or imposing a relative importance or implicitly indicating the number of technical features indicated. Thus, a feature that is limited by "first", or "second" may expressly or implicitly include at least one of the features.

Figure 1:
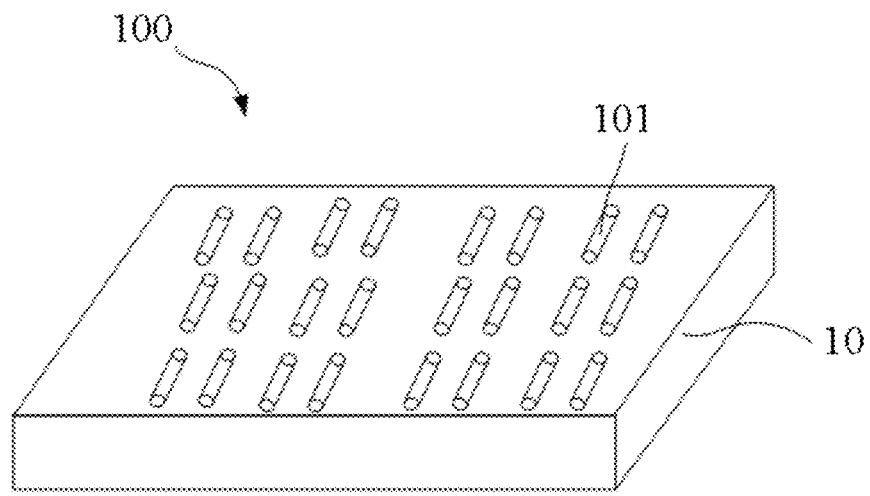
FIG. 1 is a schematic block diagram of a polarizer according to some embodiments of the present application.

Referring to FIG. 1, some embodiments of the present application provide a polarizer 100 that may be used in a liquid crystal display (LCD). A liquid crystal display device has a liquid crystal cell in which a liquid crystal layer is encapsulated between an array substrate and a color filter substrate. When an electric field is applied to electrodes on the array substrate and the color filter substrate, alignments of liquid crystal molecules of the liquid crystal layer between the array substrate and the color filter substrate change, thereby displaying an image. Polarizers are disposed on outer sides of the array substrate and the color filter substrate. The polarizer selectively transmits light traveling in a specific direction among incident light from a backlight unit or light transmitted through the liquid crystal layer, so that polarization may be controlled.

Figure 2:
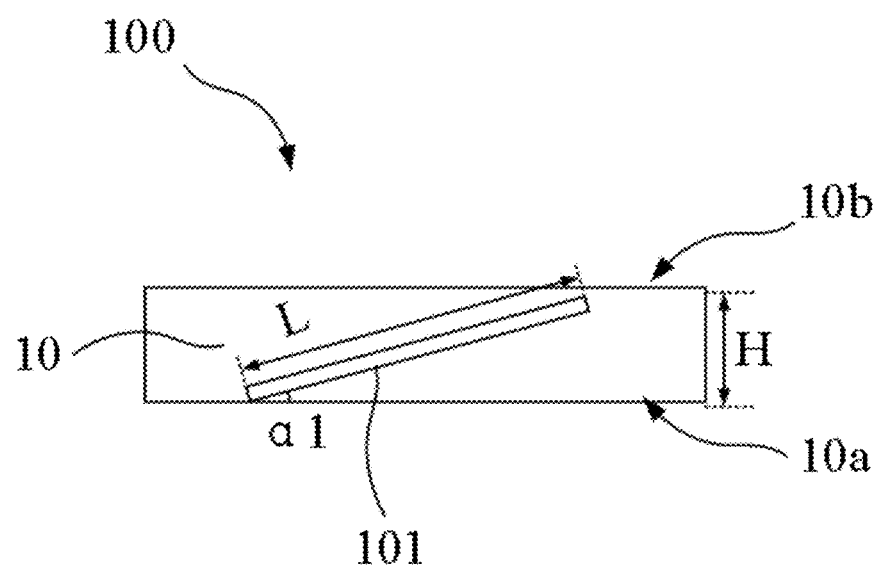
FIG. 2 is a schematic diagram of an alignment of whiskers in a resin layer according to some embodiments of the present application.

The polarizer 100 includes a resin layer 10 including whiskers 101. Referring to FIG. 2, the thickness of the resin layer 10 is H, the length of the whisker 101 is L, and an acute angle α1 formed by a long-axis direction of the whisker 101 and a bottom surface 10a of the resin layer 10 is in a range of −arcsin (H/L) to arcsin (H/L). It has been found that the acute angle α1 affects the performance on the viewing angle of the polarizer 100.

In an embodiment, the whisker 101 is added into the polarizer 100, and when the acute angle formed by the long-axis direction of the whisker 101 and the bottom surface 10a is greater than 0° and less than or equal to 40°, the improvement of the luminance viewing angle and the chrominance viewing angle is facilitated. In an embodiment, since each of the whiskers 101 has the same length, the amount of light scattered by the whisker 101 is a constant value. The amount of light scattered by the whisker 101 may be divided into a component of the light scattered by the whisker 101 in a direction parallel to the bottom surface of the resin layer 10 (referred to as a left-right component for short) and a component of the light scattered by the whisker 101 in a direction perpendicular to the bottom surface of the resin layer 10 (referred to as an up-down component for short). If the left-right component is larger, the up-down component is lesser. The smaller the angle formed by the whisker 101 and the resin layer 10, the larger the left-right component (i.e., the larger the projection of the whisker 101 on the resin layer 10), the stronger the left-right scattering, the better the left-right viewing angle performance, and vice versa.

Further, the experimental results show that when the acute angle α1 formed by the long-axis direction of the whisker 101 and the bottom surface 10a is less than or equal to 20°, The luminance viewing angle and the chrominance viewing angle of the display device are further improved.

It should be noted that the polarizer 100 may include a plurality of film layers (not shown in FIG. 1) stacked in sequence. The plurality of sequentially laminated film layers of the polarizer 100 include a polarizing function layer, and the resin layer 10 is provided on a side of the polarizing function layer or the polarizing function layer is a resin layer 10. The thickness of the resin layer 10 refers to the thickness in a direction along which the plurality of film layers are laminated. The resin layer 10 includes a bottom surface 10a and a top surface 10b opposite to each other in the direction along which the plurality of film layers are laminated. Alternatively, the bottom surface 10a is located on a light incidence side of the top surface 10b, or the bottom surface 10a is the surface formed before the resin layer 10 is formed.

Alternatively, the whisker 101 is a cylinder or pyramid, e.g., a cylinder, an elliptical column, a triangular prism, a tetragonal prism, a polygonal prism, a triangular pyramid, a tetragonal pyramid, or a polygonal pyramid. The long-axis direction of the whisker 101 indicates a height direction of the cylinder or cone, and the length L indicates a length in the height direction of the cylinder or cone, also referred to as the length in the long-axis direction.

Alternatively, the resin layer 10 includes a first resin layer and a second resin layer. The whisker 101 is included only in the first resin layer, and the second resin layer does not include the whisker 101. This resin layer 10 is formed by first dispersing whiskers 101 in a resin composition, forming a first resin layer by coating to set an angle of the whisker 101 in the first resin layer, and then forming a second resin layer on the first resin layer by coating. The resin layer 10 of a predetermined thickness is formed by both the first resin layer and the second resin layer. By controlling the thickness of the first resin layer and the length L of the whisker 101, the acute angle $\alpha 1$ of the whisker 101 in the first resin layer may be determined, thereby determining the acute angle $\alpha 1$ of the whisker 101 in the resin layer 10. For example, if the whisker 101 having a length of 30 μm is mixed with the resin composition, the first resin layer of 5 μm is formed on the intermediate substrate by coating the mixture, and the second resin layer of 20 μm is formed on the first resin layer, a resin layer 10 having a thickness of 25 μm may be obtained in which the acute angle $\alpha 1$ formed by the long-axis direction of the whisker 101 and the bottom surface 10a is arcsin (5/30)=9.59°, and so on. It will be appreciated that the acute angle $\alpha 1$ may be slightly errored within the range allowed by the process.

Alternatively, the material of the whisker 101 is selected from at least one of compounds: metal oxides such as titanium oxide (e.g., $TiO_2$), zirconium oxide (e.g., $ZrO_2$), or zinc oxide (e.g., ZnO); metal compounds such as calcium carbonate ($CaCO_3$); boehmite; aluminum borate (e.g., $AlBO_3$); calcium silicate (e.g., $CaSiO_3$, wollastonite); magnesium sulfate ($MgSO_4$); magnesium sulfate hydrate (e.g., $MgSO_4 \cdot 7H_2O$) and potassium titanate (e.g., $K_2Ti_8O17$) glasses and synthetic resin. Further, the material of the whisker 101 is selected from at least one of titanium oxide, zirconium oxide, zinc oxide, calcium carbonate, boehmite, aluminum borate, calcium silicate, magnesium sulfate, magnesium sulfate hydrate, and potassium titanate.

Alternatively, the length L of the whisker 101 is in a range of 3 micrometers to 30 micrometers and the diameter of the whisker 101 is in a range of 0.003 micrometers to 13 micrometers. It should be noted that the whiskers 101 may not necessarily have the same length even if they are manufactured in a same process. In the present application, the size of the whiskers 101 is not limited herein, as long as the size of the whiskers 101 is in the above-mentioned range.

In an embodiment, the length of the whisker 101 may be 3 micrometers, 4 micrometers, 5 micrometers, 5 micrometers, 6 micrometers, 7 micrometers, 8 micrometers, 9 micrometers, 10 micrometers, 10 micrometers, 11 micrometers, 12 micrometers, 13 micrometers, 14 micrometers, 15 micrometers, 16 micrometers, 17 micrometers, 18 micrometers, 19 micrometers, micrometers, 21 micrometers, 22 micrometers, 23 micrometers, 24 micrometers, 25 micrometers, 26 micrometers, 27 micrometers, 28 micrometers, 29 micrometers, or 30 micrometers.

Alternatively, the diameter of the whisker 101 is 0.003 micrometers, 0.005 micrometers, 0.008 micrometers, 0.01 micrometers, 0.3 micrometers, 0.4 micrometers, 0.5 micrometers, 0.6 micrometers, 0.7 micrometers, 0.8 micrometers, 0.9 micrometers, 1.0 micrometers, 1.1 micrometers, 1.2 micrometers, 1.3 micrometers, 1.4 micrometers, 1.5 micrometers, 1.6 micrometers, 1.7 micrometers, 1.8 micrometers, 1.9 micrometers, 1.10 micrometers, 1.11 micrometers, 1.12 micrometers, 1.13 micrometers, 1.14 micrometers, 1.15 micrometers, 1.16 micrometers, 1.17 micrometers, 1.18 micrometers, 1.19 micrometers, 1. micrometers, 1.21 micrometers, 1.22 micrometers, 1.23 micrometers, 1.24 micrometers, 1.25 micrometers, 1.26 micrometers, 1.27 micrometers, 1.28 micrometers, 1.29 micrometers, 1.30 micrometers, 2 micrometers, 3 micrometers, 4 micrometers, 5 micrometers, 6 micrometers, 7 micrometers, 8 micrometers, 9 micrometers, 10 micrometers, 11 micrometers, 12 micrometers, or 13 micrometers. The light loss may be reduced due to the excessive area of the whisker 101, while the occurrence of Mie scattering is ensured.

If the size of the whisker 101 is too less, a scattering effect is not achieved. If the size of the whisker 101 is too great, due to the limited thickness (ten or so micrometers to dozens of micrometers) of the film layers of the resin layer 10, the whisker 101 in the resin layer 10 protrudes from the resin layer 10, thereby affecting the flatness of the film layer. In addition, if the length of the whisker 101 is too great, the whisker 101 is prone to excessive aggregation, thereby affecting the appearance of the resin layer 10.

Figure 3:
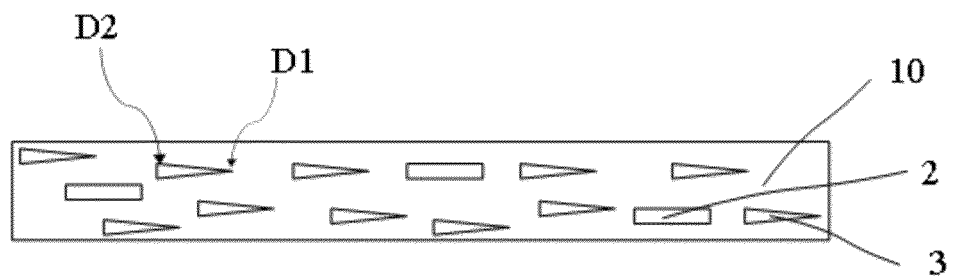
FIG. 3 is a schematic block diagram of a resin layer according to an embodiment of the present application.
Figure 4:
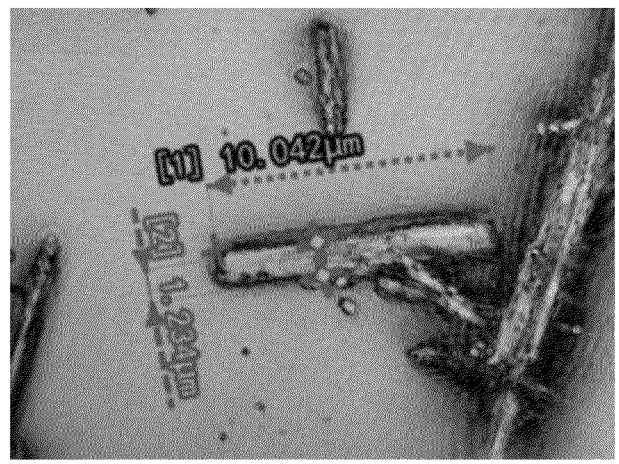
FIG. 4 is a characterization diagram of first particles of a resin layer according to an embodiment of the present application.

Referring to FIGS. 3 and 4, the whisker 101 includes first particles 2 and second particles 3. Each first particle 2 has a diameter constant in a length direction of the first particle 2. Each of the second particle 3 includes a first end portion D1 and a second end portion D2 provided in a length direction thereof, and the first end portion D1 has a diameter that decreases with an increasing distance from the second end portion D2 in the length direction of the second particle. A length direction of the particle is a long-axis direction thereof.

In an embodiment of the present application, the first particles 2 and the second particles 3 are provided in the resin layer 10 of the polarizer 100, so that the polarizer 100 has a scattering effect, and the display panel to which the polarizer 100 is attached has a better contrast ratio. The first particles 2 have a diameter constant in a length direction of the first particle 2. Each of the second particle 3 includes a first end portion D1 and a second end portion D2 provided in a length direction thereof, and the first end portion D1 has a diameter that decreases with an increasing distance from the second end portion D2 in the length direction. The polarizer 100 has a scattering effect due to the first particles 2 or the second particles 3, and the chromaticity viewing angle of the display panel to which the polarizer 100 is attached may be improved. The mixing of the second particles 3 and the first particles 2 may reduce the influence of one of the second particles 3 and the first particles 2 on the contrast ratio of the display panel to which the polarizer 100 is attached, so that the display panel to which the polarizer 100 is attached has a better contrast.

Note that the contrast ratio in the present application refers to a ratio of luminance in a bright state of the display panel to luminance in a dark state of the display panel. If only the first particle 2 of the constant diameter is provided, that is, only cylindrical particles are provided, in the polarizer 100, the cylindrical particles have a good scattering effect. In the dark state, ambient light is scattered by the first particles 2, and the luminance of the display panel is greater. In the bright state, the light emitted by the light-emitting unit is scattered by the first particles 2, and the luminance of the display panel is lesser due to uniform diffusion. Therefore, the contrast ratio of the display panel is significantly reduced by combining the above influences. The scattering effect of the second particle 3, of which the first end portion D1 has the diameter that decreases with the increasing distance from the second end portion D2 in the length direction, is weaker than that of the first particle 2. Both the first particle 2 and the second particle 3 are provided in the polarizer 100. Therefore, in the dark state, the ambient light is scattered by the mixed particles, and the luminance of the display panel is lesser. In the bright state, the light emitted by the light-emitting unit is scattered by the mixed particles, so that the luminance of the display panel is greater. As a result, the polarizer 100 has a scattering effect, while the contrast ratio of the display panel to which the polarizer 100 is attached is less affected by the particles, so that the contrast is improved.

In addition, only the first particle 2 having the constant diameter is provided, that is, only a cylindrical particle is provided, in the polarizer 100, and the light transmittance of the polarizer 100, in which only the first particle 2 of the constant (that is, only cylindrical particles are provided) is slightly lower than that of the polarizer 100 in which the first particle 2 and the second particle 3 are mixed.

Alternatively, the thickness of the resin layer 10 is greater than 3 micrometers and less than 50 micrometers. In an embodiment, the thickness of the resin layer 10 may be 4 micrometers, 5 micrometers, 6 micrometers, 10 micrometers, 12 micrometers, 15 micrometers, 17 micrometers, 18 micrometers, 20 micrometers, 24 micrometers, 25 micrometers, 26 micrometers, 30 micrometers, 33 micrometers, 35 micrometers, 38 micrometers, 40 micrometers, 45 micrometers, or 48 micrometers.

Figure 5:
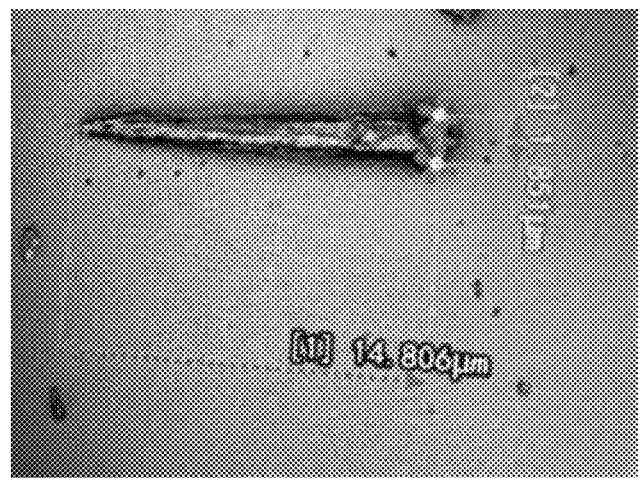
FIG. 5 is a characterization diagram of a second particle of a resin layer according to a second embodiment of the present application.

In an embodiment as shown FIG. 5, the diameter of the second particle 3 decreases in a direction from the second end portion D2 toward the first end portion D1. That is, each of the second particles 3 has a long cone-shaped shape.

It will be appreciated that the scattering effect of the second particle 3 of the long cone-shaped shape is weaker than that of the first particle 2. Therefore, by mixing the second particles 3 and the first particles 2 in the resin layer 10, the polarizer 100 may have a scattering effect, while the contrast ratio of the display panel to which the polarizer 100 is attached may be less affected by the particles, so that the contrast ratio may be improved.

In the present embodiment, the diameter of the first particle 2 is in a range of 0.008 μm to 12.4 μm. Each second particle 3 has a maximum diameter of 12.4 μm and a minimum diameter of 0.008 μm.

In an embodiment, the diameter of the first particle 2 may be 0.008 micrometers, 0.01 micrometers, 0.05 micrometers, 0.1 micrometers, 0.5 micrometers, 1 micrometer, 1.4 micrometers, 2 micrometers, 2.5 micrometers, 3 micrometers, 3.6 micrometers, 5 micrometers, 5.7 micrometers, 6 micrometers, 8 micrometers, 9 micrometers, 10 micrometers, 11 micrometers, 12 micrometers, 12.4 micrometers, etc. It will be readily appreciated that the first particle 2 having a diameter constant in a length direction of the first particle 2 indicates that the cylindrical particles have a diameter deviation within ±20%. For example, the diameter of the first particle 2 is in a range of 1 micrometer to 3 micrometers with a deviation of ±20%, that is, the diameter ranges from 0.8 micrometers to 1.2 micrometers.

The second particle 3 may have a maximum diameter of 0.5 micrometers, 1 micrometer, 1.4 micrometers, 2 micrometers, 2.5 micrometers, 3 micrometers, 3.6 micrometers, 5 micrometers, 5.7 micrometers, 6 micrometers, 8 micrometers, 9 micrometers, 10 micrometers, 11 micrometers, 12 micrometers, 12.4 micrometers, etc., a minimum diameter of 0.008 micrometers, 0.01 micrometers, 0.05 micrometers, 0.1 micrometers, 0.5 micrometers, 1 micrometer, 1.4 micrometers, 2 micrometers, 2.5 micrometers, 3 micrometers, 3.6 micrometers, 5 micrometers, 5.7 micrometers, 6 micrometers, 8 micrometers, 9 micrometers, 10 micrometers, etc. It will be readily appreciated that the maximum diameter of the second particles 3 is greater than the minimum diameter.

Alternatively, the ratio of the length to radius of the particles is greater than 1. In an embodiment, the ratio of the length to the radius of the particles may be 1.5, 2, 2.5, 3, 5, etc.

In an embodiment of the present application, the diameter of the first particle 2 is in a range of 0.008 μm to 12.4 μm, the maximum diameter of the second particle 3 is 12.4 μm, and the minimum diameter of the second particle 3 is 0.008 μm, so that the light passing through the resin layer 10 may be subjected to Mie scattering, and the scattering effect may be improved. The resin layer 10 may be attached to the display panel to improve the chromaticity viewing angle.

In an embodiment, scattering includes Mie scattering and Rayleigh scattering. Mie scattering means that when light is incident onto a particle with a diameter comparable to or larger than the wavelength of light, the light is scattered mainly towards the direction in which it was traveling. That is, the intensity of a portion of the scattered light traveling along a first direction in which the light was traveling is greater than the intensity of a portion of the scattered light traveling along a second direction opposite to the first direction. The light subjected to Rayleigh scattering is scattered uniformly in both the first direction and the second direction. That is, along the direction in which the light was traveling, the intensity of the light subjected to Rayleigh scattering is less than the intensity of the light subjected to Mie scattering. Therefore, the light passing through the resin layer 10 is subjected to Mie scattering, thereby achieving a good scattering effect and reducing light loss.

Figure 6:
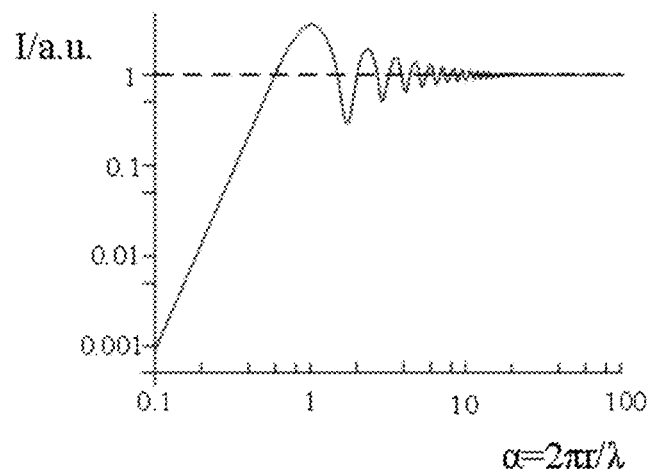
FIG. 6 is a schematic diagram of light scattering intensity versus dimensionless scale.

Mie scattering and Rayleigh scattering are generally distinguished by the wavelength of the light and the size of the particle, and different processing methods are used depending on the relative relationship between the size of the particle and the wavelength of the light. In an embodiment of the present application, a dimensionless scale is used as a criterion, and the dimensionless scale is a function of the ratio of the radius of the particle to the wavelength of the light, and the formula is: $\alpha = 2\pi r/\lambda$. Where $\alpha$ is a dimensionless scale, $r$ is the radius of the particle, and $\lambda$ is the wavelength of the light. When the diameter of the particle is in a range of 0.008 μm to 12.4 μm, that is, the radius of the particle is in a range of 0.004 μm to 6.2 μm, the dimensionless scale $\alpha$ is greater than or equal to 0.1, and a is less than 50. That is, when the dimensionless scale α is within this range, the light is subjected to Mie scattering. When the dimensionless scale α is much less than 0.1, the light is subjected to Rayleigh scattering. The intensity of the scattered light is a function of the ratio of the radius of the particle to the wavelength of the light. FIG. 6 is a schematic diagram of the intensity of the scattered light versus the value of the dimensionless scale, where the horizontal coordinate is a, and the vertical coordinate is the intensity I of the scattered light. When the dimensionless scale α is greater than or equal to 0.1, the intensity I of the scattered light increases with the increase of the dimensionless scale α, until it increases to and stabilizes at 1. In the present embodiment, the ratio of the mass of all the first particles 2 to the mass of all the second particles 3 is (1 to 10):(90 to 99). In an embodiment, the ratio of the mass of all the first particles 2 to the mass of all the second particles 3 may be 1: 99, 2: 98, 3: 97, 4: 96, 5: 95, 6: 94, 7: 93, 8: 92, 9: 91 or 10: 90.

It will be appreciated that the ratio of the mass of all the first particles 2 to the mass of all the second particles 3 is in the above range, such that after the polarizer 100 is attached to the display panel, the chromaticity viewing angle is greater and the contrast ratio is greater.

Figure 7:
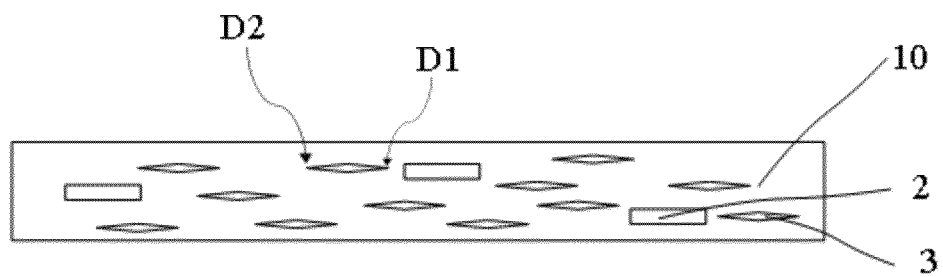
FIG. 7 is a schematic block diagram of a resin layer according to another embodiment of the present application.
Figure 8:
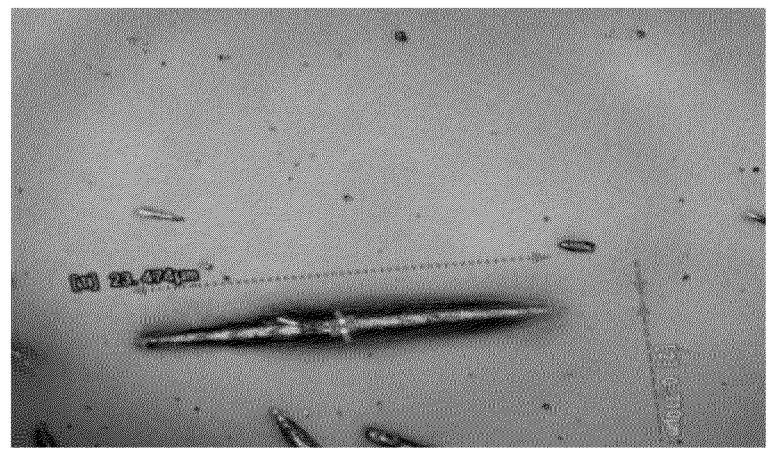
FIG. 8 is a schematic block diagram of a second particle of a resin layer according to another embodiment of the present application.

Referring to FIGS. 7 and 8, an embodiment of the present application provides a polarizer 100. The polarizer 100 differs from the polarizer in the embodiment with reference to FIG. 1 in that the second end portion has a diameter that decreases with an increasing distance from the first end portion in the length direction of the second particle. In another word, the diameter of the second particle gradually decreases in the direction from the middle of the second particle to the second end portion and in the direction from the middle of the second particle to the first end portion. That is, each second particle 3 in the present embodiment have a biconical shape.

It will be appreciated that the scattering effect of the biconical second particles 3 is weaker than that of the first particles 2. Therefore, by mixing the second particles 3 and the first particles 2 in the resin layer 10, the polarizer 100 has a scattering effect, while the contrast ratio of the display panel to which the polarizer 100 is attached is less affected by the particles, so that the contrast ratio is improved.

Figure 9:
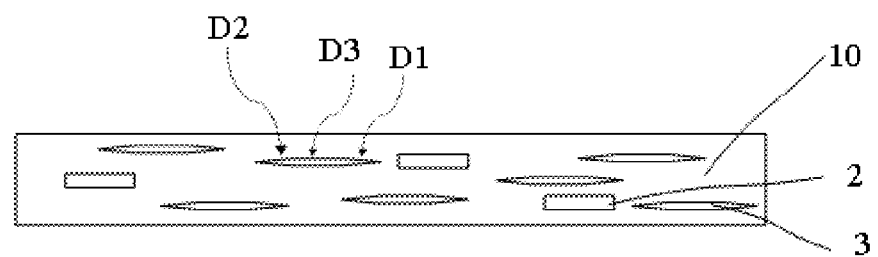
FIG. 9 is a schematic block diagram of a resin layer according to another embodiment of the present application.
Figure 10:
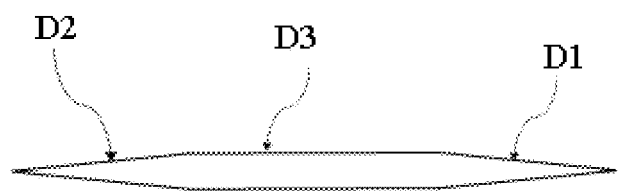
FIG. 10 is a schematic block diagram of a second particle of a resin layer according to another embodiment of the present application.

Referring to FIGS. 9 and 10, an embodiment of the present application provides a polarizer 100. This embodiment differs from the embodiments with reference to FIGS. 3 and 7 in that the second particle 3 further includes an intermediate portion D3, and the first end portion D1, the intermediate portion D3 and the second end portion D2 are connected in sequence. The intermediate portion D3 has a diameter constant in a length direction of the second particle 3. The diameter of the second end portion D2 decreases with the increase of a distance from the intermediate portion D3. That is, the second particle 3 in the present embodiment includes a particle that is cylindrical in the middle thereof and conical at both ends therefore.

It will be appreciated that the scattering effect of the second particle 3, which is cylindrical in the middle and conical at both ends, is weaker than that of the first particle 2. Therefore, by mixing the second particles 3 and the first particles 2 in the resin layer 10, the polarizer 100 has a scattering effect, while the contrast ratio of the display panel to which the polarizer 100 is attached is less affected by the particles, so that the contrast ratio is improved.

Figure 11:
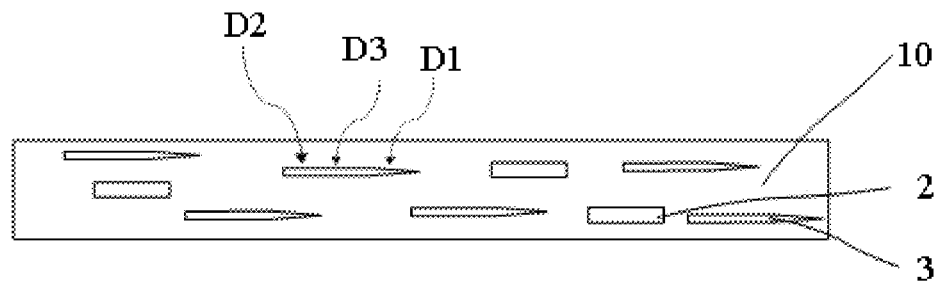
FIG. 11 is a schematic block diagram of a resin layer according to another embodiment of the present application.
Figure 12:
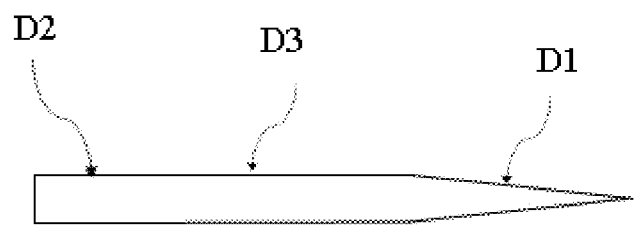
FIG. 12 is a schematic block diagram of a second particle of a resin layer according to another embodiment of the present application.

Referring to FIGS. 11 and 12, another embodiment of the present application provides a polarizer 100. This embodiment differs from the embodiment with reference to FIG. 3 in that the second particle 3 further includes an intermediate portion D3, and the first end portion D1, the intermediate portion D3, and the second end portion D2 are connected in this order. Each of the intermediate portion D3 and the second end portion D2 has a diameter constant in a length direction of the second particle 3. That is, the second particle 3 in the present embodiment further includes a particle in which the first end portion D1 is conical and the remaining portion is cylindrical.

It will be appreciated that the scattering effect of the second particle 3 in which the first end portion D1 is conical and the remaining portion is cylindrical. is weaker than that of the first particles 2. Therefore, by mixing the second particles 3 and the first particles 2 in the resin layer 10, the polarizer 100 has a scattering effect, while the contrast ratio of the display panel to which the polarizer 100 is attached is less affected by the particles, so that the contrast ratio is improved.

Figure 13:
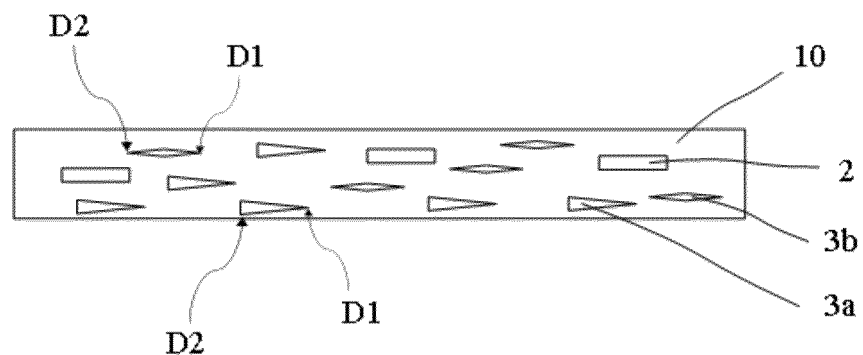
FIG. 13 is a schematic block diagram of a resin layer according to another embodiment of the present application.
Figure 14:
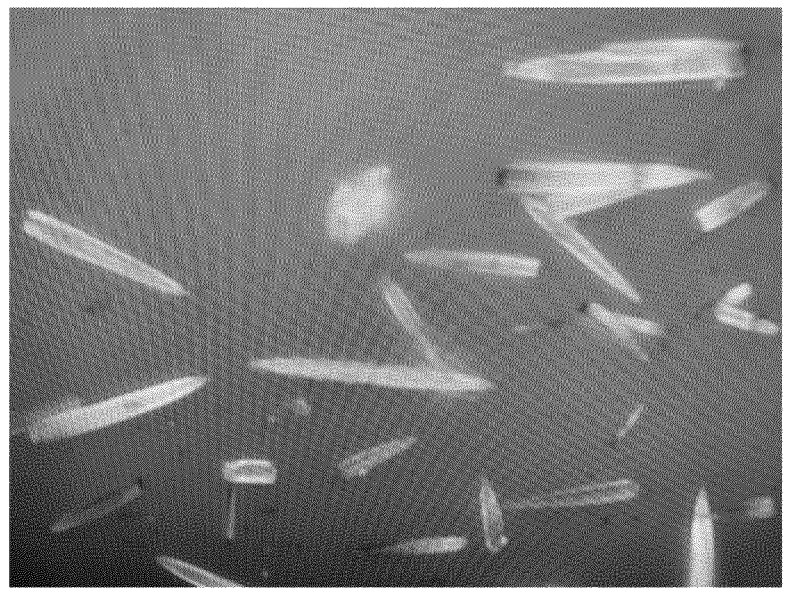
FIG. 14 is a characterization diagram of a first particle, a first-type particle, and a second-type particle in a resin layer according to an embodiment of the present application.

Referring to FIGS. 13 and 14, a yet another embodiment of the present application provides a polarizer 100, which differs from the embodiments with reference to FIGS. 3 and 7 in that the second particle 3 includes a first-type particle 3a and a second-type particle 3b. Each of the first-type particles 3a and the second-type particles 3b includes a first end portion D1 and a second end portion D2 arranged in a length direction thereof. The diameter of each of the first-type particles 3a decreases in the direction from the second end portion D2 of the first-type particles 3a toward the first end portion D1 of the first-type particles 3a. The diameter of the first end portion D1 of the second-type particles 3b decreases with an increasing distance from the second end portion D2 of the second-type particles 3b in the length direction. The diameter of the second end portion D2 of the second-type particles 3b decreases with an increasing distance from the first end portion D1 of the second-type particles 3b in the length direction. That is, the second particle 3 in the present embodiment includes a long cone-shaped particle and a biconical particle.

It will be appreciated that the scattering effect of the second particles 3 including the long cone-shaped first-type particles 3a and the biconical second-type particles 3b is weaker than that of the first particles 2. Therefore, by mixing the second particles 3 and the first particles 2 in the resin layer 10, the polarizer 100 has a scattering effect, while the contrast ratio of the display panel to which the polarizer 100 is attached is less affected by the particles, so that the contrast ratio is improved.

It should be noted that the second particles 3 in various embodiments of the present application may be combined in any combination. For example, the second particles 3 may include a long cone-shaped particle and a bi-conical particle. For another example, the second particle 3 may include a long cone-shaped particle, a bi-conical particle, and a particle in which the first end portion D1 is conical and the remaining portion is cylindrical. The second particles 3 may include a bi-conical particle and a particle in which the first end portion D1 is conical and the remaining portion is cylindrical. Alternatively, the second particle 3 is a long cone-shaped particle and a particle in which the first end portion D1 and the second end portion D2 are a conical particle and the middle portion is a cylindrical particle. The present application is not limited.

In the present embodiment, the ratio of the masses of all the first particles 2, the mass of all the first-type particles 3a, and the mass of all the second-type particles 3b is (1 to 10):(40 to 70):(20 to 60). In an embodiment, the ratio of the mass of all first particles 2, the mass of all first particles 3a, and the mass of all second particles 3b may be 1: 40: 59, 2: 42: 56, 3: 45: 52, 4: 48: 48, 5: 70: 25, 5: 69: 26, 6: 68: 26, 7: 55: 38, 8: 55: 37, or 9: 52: 39.

It will be appreciated that the ratio of the mass of the first particles 2, the mass of the first-type particles 3a, and the mass of the second-type particles 3b may be in the above range, such that when the polarizer 100 is attached to the display panel, the chromaticity viewing angle is greater and the contrast ratio is greater.

Further, the ratio of the mass of all the first particles 2, the mass of all the first-type particles 3a, and the mass of all the second-type particles 3b may be (50 to 55):(1 to 5):(45 to 50), such that the display panel to which the polarizer 100 is attached has a chromaticity viewing angle of 160 degrees or more and a contrast ratio of 2800 or more. In an embodiment, the ratio of the mass of all the first particles 2, the mass of all the first-type particles 3a, and the mass of all the second-type particles 3b is 50: 5: 45, 51: 4: 45, 52: 3: 45, 53: 2: 45, or 54: 1: 45.

Alternatively, the ratio of the sum of the masses of the first particles 2, the first-type particles 3a, and the second-type particles 3b to the mass of the polarizer 100 is 1% to 30%. In an embodiment, the ratio of the sum of the masses of the first particles 2, the first-type particles 3a, and the second-type particles 3b to the mass of the polarizer 100 is 1%, 2%, 5%, 7%, 8%, 10%, 15%, 20%, or 30%. The ratio of the sum of the masses of the first particles 2, the first-type particles 3a, and the second-type particles 3b to the mass of the polarizer 100 is in the above range, so that the scattering effect of the polarizer 100 is greater, and the light transmittance of the polarizer 100 is greater.

In this embodiment, the ratio of the sum of the masses of the first particles 2, the first-type particles 3a, and the second-type particles 3b to the mass of the polarizer 100 is 10%, so that the display panel to which the polarizer 100 is attached may have a chromaticity viewing angle of 160 degrees or more and the light transmittance of the display panel is 4.65% or more.

Alternatively, the material of the resin layer 10 may be selected from a cellulose ester resin such as triacetylcellulose (TAC) or the like, a cyclic polyolefin resin including amorphous cyclic polyolefin (COP) or the like, a polycarbonate resin, a polyester resin including polyethylene terephthalate (PET) or the like, a polyethersulfone resin, a polysulfone resin, a polyamide resin, a polyimide resin, an acyclic polyolefin resin, a polyacrylate resin including poly(methyl methacrylate) resin or the like, a polyvinyl alcohol resin, a polyvinyl chloride resin, or a polyvinylidene chloride resin. Alternatively, the material of the resin layer 10 may be selected from a polyurethane resin, an acrylic resin, an epoxy resin, a vinyl resin, and a silicone resin.

Alternatively, the resin layer further includes a first polymer in which the whiskers are dispersed. A second polymer is attached to a surface of the whisker. The first polymer is a lipophilic polymer and the second polymer is a lipophilic polymer. Hereinafter, the whisker, of which the second polymer is attached the surface is also referred to as a polymer-modified whisker for ease of explanation.

In the present embodiment, the first polymer is a lipophilic polymer, and the second polymer is a lipophilic polymer, so that the lipophilicity of the surface of the whisker may be improved and the whisker is more easily dispersed in the first polymer. The lipophilicity of the first polymer, the lipophilicity of the second polymer, and the lipophilicity of the polymer-modified whisker may be determined by a surface tension test, a contact angle test, a wettability test, or the like.

In an embodiment, the dispersibility of the polymer-modified whisker in the first polymer is greater than that of the unmodified whisker in the first polymer, that is, when the unmodified whiskers start to agglomerate after being dispersed in the first polymer of the first mass, the sum mass of the whiskers added into the first polymer is the second mass. When the polymer-modified whisker starts to agglomerate after being dispersed in the first polymer of the first mass by the same dispersion method as that of the unmodified whiskers, the sum mass of the polymer-modified whisker added into the first polymer is the third mass. The mass of whiskers of the polymer-modified whiskers having the third mass is greater than the second mass. That is, before the aggregation occurs, more polymer-modified whiskers may be dispersed in the first polymer of the same mass than the unmodified whiskers.

In some embodiments, the surface of the whisker is modified by using at least one of inorganic cation, inorganic anion, a coupling agent, or a surfactant, i.e., the surface of the whisker is attached with at least one of an inorganic cation group, an inorganic anion group, a coupling agent group, or a surfactant group.

In some embodiments, the surface of the whisker is modified by using at least one of inorganic magnesium salt, inorganic calcium salt, inorganic barium salt, inorganic strontium salt, stearic acid, stearate, sulfonic acid surfactant, thio surfactant, titanate, aluminate, silane, alkyl phosphate, aryl phosphate, alkyl phosphate, aryl phosphate, alkyl alcohol amide phosphate, alkyl alcohol amide phosphate, imidazoline phosphate, imidazoline phosphate, polyphosphate, polyphosphate, and siloxane phosphate. In an embodiment, the surface of the whisker is modified by using at least one selected from the group consisting of magnesium chloride, calcium chloride, barium chloride, strontium chloride, stearic acid, sodium stearate, zinc stearate, sulfonic acid surfactant, thio surfactant, titanate, aluminate, silane, alkyl phosphate, aryl phosphate, alkyl phosphate, aryl phosphate, alkyl alcohol amide phosphate, alkyl alcohol amide phosphate, imidazoline phosphate, imidazoline phosphate, polyphosphate, polyphosphate, and siloxane phosphate. In an embodiment, the surface of the whisker is modified by using at least one of sulfonic acid surfactant and thio-based surfactant. The sulfonic acid surfactant may be selected from at least one of alkyl sulfonates, fluoroalkyl sulfonates. In an embodiment, the sulfonic acid surfactant may be at least one of sodium dodecyl sulfonate, sodium dodecyl benzene sulfonate, and sodium fluorododecyl sulfonate. The thio-based surfactant may be selected from at least one of thiol, fluorigenic thiol. In an embodiment, the thio-based surfactant may be at least one of octanethiol, dodecanethiol, tetradecanethiol, octadecanethiol, fluorooctanethiol, or fluorododecanethiol. When the sulfonic acid surfactant is mixed with the whisker to be surface-modified, a sulfonic acid-based shell layer (such as a benzene ring sulfonic acid-based shell layer) is formed by the sulfonic acid surface-active group on the surface of the whisker, which is favorable for protecting the whisker, enhancing the toughness of the whisker, and reducing the fracture of the polymer-modified whisker formed by the whisker in the first resin composition. When the thio-based surface-active group and the whisker to be surface-modified are mixed, a cross-linked network of O—S—O is formed by the thio-based surface-active group and the hydroxyl group on the surface of the whisker, and the bond energy of O—S—O is relatively greater, which facilitates to protect the whisker and reduce the fracture of the polymer-modified whisker in the process of further connecting the second polymer to the surface of the whisker and then mixing the second polymer with the first polymer to form the resin composition, and improves the optical functions such as the contrast ratio and the luminance due to the polymer-modified whisker. In an embodiment, the surface of the whisker is modified by using at least one of a sulfonic acid surfactant containing a fluorine substituent, a thio-based surfactant containing fluorine substituent, for example, at least one of sodium fluorododecyl sulfonate, fluorooctanethiol, or fluorododecanethiol. The fluorine atom has high stability in the alkyl chain, the bond energy of the carbon-fluorine bond is higher than that of the carbon-carbon bond, and the carbon-fluorine bond has a shielding effect on the carbon-carbon bond, thereby facilitating to protect the carbon-carbon bond, thereby improving the stability of the whisker. Further, after the surface of the whisker is modified by using at least one of inorganic cation, inorganic anion, a coupling agent, or a surfactant, the richness of the group on the surface of the whisker is increased, the attachment sites of second polymers become more, and the diversity of the polymer material for the second polymer is increased.

In some embodiments, the surface of the polymer-modified whisker includes at least one of polyacrylate group, acrylate-acrylic acid copolymer group, polycarboxylic acid-type water-soluble or comb copolymer group, polydimethylsiloxane group. In some embodiments, the second polymer is selected from at least one of polyacrylate group, acrylate-acrylic acid copolymer group, polycarboxylic acid-type water-soluble comb copolymer group, or polydimethylsiloxane group.

In some embodiments, the polyacrylate group may be selected from at least one of polymethyl methacrylate group, polyglycidyl methacrylate group, poly(2-hydroxyethyl methacrylate) group, polymethyl acrylate group, polyethyl acrylate group, polybutyl acrylate group, and poly(2-ethylhexyl acrylate) group.

In some embodiments, the polycarboxylic acid-type water-soluble comb copolymer group may be a graft polymer formed from comonomers such as polyoxyethylene methyl allyl diether, maleic anhydride, styrene, or the like. The polycarboxylic acid-type water-soluble comb copolymer group may include polyoxyethylene methyl allyl diether group, polymaleic anhydride group, polystyrene group.

In some embodiments, the molecular weight of the monomers forming the second polymer is greater than or equal to 50, and less than or equal to 500.

In some embodiments, the surface of the polymer-modified whisker includes a group same as that of the first polymer. Alternatively, the surface of the polymer-modified whisker includes a group same as the homologue of the first polymer. In some embodiments, the second polymer is the same as the first polymer, or the second polymer is a homologue of the first polymer. The surface of the polymer-modified whisker includes group same as the first polymer, or group same as the homologue of the first polymer, so that the dispersibility of the polymer-modified whisker in the resin composition may be improved, thereby reducing actual amount of polymer-modified whisker, and thereby reducing loss of light exiting from the display device while improving the chromaticity viewing angle of the display device.

The method of attaching the second polymer to the surface of the whisker to form the polymer-modified whisker may include at least one of a physical method or a chemical method. The physical method may include at least one of a sol-gel method, a precipitation method, or a plasma treatment method. The chemical method may include at least one of a heterogeneous coacervation method, a gas phase grafting method, a radiation grafting method, a high temperature grafting method, a photo-initiated grafting method, a melt grafting method, a solution grafting method, a solid phase grafting method, a microencapsulation technique, or a chemical vapor deposition. The second polymer may be bonded to the group of the surface of the whisker through a side chain group, e.g., to form a chemical bond or a hydrogen bond, thereby being attached to the surface of the whisker. The backbone of the second polymer has a certain length to at least partially warp the whisker. In an embodiment, the second polymer completely warps the whisker. The dispersion of the whisker in the second polymer is better than the dispersion of the whisker in the first polymer, thereby making the dispersion of the polymer-modified whisker greater than the dispersion of the whisker in the first polymer.

In some embodiments, the first polymer may be selected from at least one of polymethyl methacrylate, polymethyl acrylate, polyethyl acrylate, polybutyl acrylate, poly(2-ethylhexyl acrylate), cellulose triacetate, polyethylene terephthalate, polycarbonate, polymethyl methacrylate, polyethylene naphthalate, polycyclic olefin.

In some embodiments of the present application, the polymer-modified whisker is obtained by attaching the second polymer to the surface of the whisker, the first polymer is a lipophilic polymer, and the second polymer is a lipophilic polymer. Therefore, the dispersion of the polymer-modified whisker in a resin composition is improved, the actual use amount of the polymer-modified whisker is reduced when the resin composition is applied to a polarizer, and the loss of the light emitted from the display device is reduced while the chromaticity viewing angle of the display device is improved.

It will be appreciated that the material and properties of the resin layer 10 may vary depending on its particular location in the polarizer.

Hereinafter, polarizers according to various embodiments the present application will be described. The refractive index of the resin layer 10 is lower than that of the whisker 101. Note that the refractive index of the resin layer 10 refers to the refractive index of the resin matrix of the resin layer 10 other than the whisker 101. For example, the refractive index n1 of the whisker 101 is in a range of 1.6 to 1.7, and the refractive index n2 of the resin layer 10 is in a range of 1.3 to 1.5.

According to some embodiments of the present application, the polarizer 100 includes a first substrate, a second substrate, and a polarizing function layer, the first substrate and the second substrate are disposed on opposite sides of the resin layer 10, respectively, and the polarizing function layer is disposed on one side of the first substrate away from the resin layer. Alternatively, the resin layer 10 is used as an adhesive layer to adhere the first substrate to the second substrate. Alternatively, the polarizer 100 further includes an adhesive layer disposed between the first substrate and the resin layer 10 and adhering the first substrate and the resin layer 10.

Figure 15:
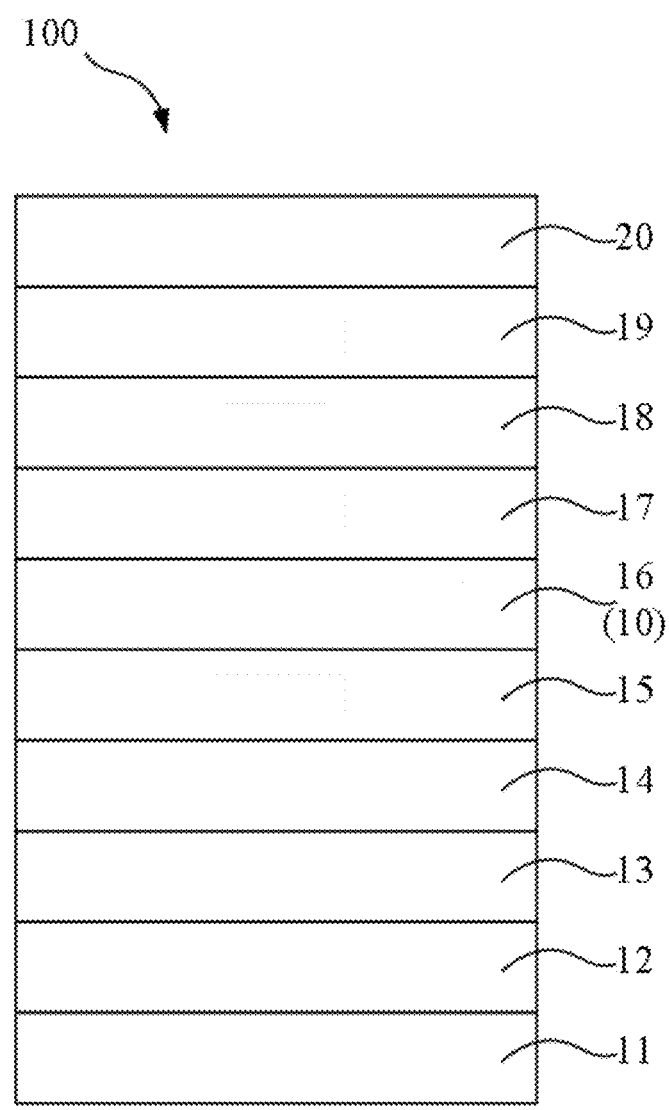
FIG. 15 is a schematic block diagram of a polarizer according to another embodiment of the present application.

An embodiment in which the resin layer 10 is used as the adhesive layer is shown in FIG. 15. The polarizer 100 includes a release film 11, a first pressure-sensitive adhesive layer 12, an optical compensation layer 13, a polarizing function layer 14, a first substrate 15, a second pressure-sensitive adhesive layer 16, a second substrate 17, a hard coat layer 18, an anti-reflection layer 19, and a protection layer 20, which are sequentially stacked. In the active state of the polarizer 100, the direction from the release film 11 to the protection layer 20 is the stacking direction of the film layers in the polarizer 100 and the incident direction of the light.

The release film 11 is configured to protect the pressure-sensitive adhesive layer from damage before the polarizer 100 is attached to the liquid crystal display panel, to avoid the generation of the bubbles during attaching. The release film 11 may include a polyester film such as a polyethylene terephthalate film, a polyolefin film such as a polyethylene film and a polypropylene film, or a polytetrafluoroethylene-based film, or may include a release-treated film such as a siloxane-based resin, melamine-based resin, or urea-based resin, so that the release film 11 is easily peeled off.

A first pressure-sensitive adhesive (PSA) layer 12 is provided on a side of the release film 11. The first pressure-sensitive adhesive layer 12 is an adhesive layer for adhering the release film 11 to film layers such as a polarizing function layer 14 provided on the release film 11. The material of the first pressure-sensitive adhesive layer 12 may be, for example, an acrylate resin.

The optical compensation layer 13 is disposed on a side of the first pressure-sensitive adhesive layer 12 away from the release film 11. The optical compensation layer 13 may be a compensation layer or a phase difference film, or the like, in which a liquid crystal based compound is coated on the surface of the substrate and oriented and cured.

The polarizing function layer 14 is disposed on a side of the optical compensation layer 13 away from the first pressure-sensitive adhesive layer 12. The polarizing function layer 14 may include polyvinyl alcohol. In an embodiment, the polarizing function layer 14 may include a polyvinyl alcohol film dyed with iodine or a polyene compound obtained by dewatering the polyvinyl alcohol film.

The first substrate 15 is disposed on a side of the polarizing function layer 14 away from the optical compensation layer 13. The first substrate 15 is configured to protect the polarizing function layer 14 and support the film layers above the first substrate 15. The first substrate 15 may include at least one material selected from the group consisting of a cellulose ester resin including triacetylcellulose (TAC) or the like, cyclic polyolefin resin including an amorphous cyclic polyolefin (COP) or the like, polycarbonate resin, polyester resin including polyethylene terephthalate (PET) or the like; polyethersulfone resin, polysulfone resin, polyamide resin, polyimide resin, acyclic polyolefin resin, polyacrylate resin including poly(methyl methacrylate) resin or the like, polyvinyl alcohol resin, and polyvinylidene chloride resin, but not limited thereto. In an embodiment, the material of the first substrate 15 is PET.

The second pressure-sensitive adhesive layer 16 is disposed on a side of the first substrate 15 away from the polarizing function layer 14. The second pressure-sensitive adhesive layer 16 is the same as the first pressure-sensitive adhesive layer 12 and is an adhesive layer for bonding the first substrate 15 and the second substrate 17. The material of the second pressure-sensitive adhesive layer 16 may be selected from the materials as listed in the description of the first pressure-sensitive adhesive layer 12, and the description thereof is omitted here.

In the present implementations, the whisker 101 is disposed in the second pressure-sensitive adhesive layer 16, that is, the resin layer 10 is the second pressure-sensitive adhesive layer 16.

The second substrate 17 is disposed on a side of the second pressure-sensitive adhesive layer 16 away from the first substrate 15. The second substrate 17 is configured to support the film layers above the second substrate 17. The material of the second substrate 17 may be selected from the materials as listed in the description of the first substrate 15, and the description thereof is omitted here. In an embodiment, the material of the second substrate 17 is PET.

The hard coat layer 18 is provided on a side of the second substrate 17 away from the second pressure-sensitive adhesive layer 16. The hard coat layer 18 has a high hardness, a waterproof and oil-proof property, and is capable of preventing the surface of the underlying film layers from being scratched and is easier to clean. Alternatively, the hard coat layer 18 has a pencil hardness greater than or equal to 2H. The hard coat layer 18 has a higher glass transition temperature, e.g., 70 degrees Celsius to 120 degrees Celsius. The material of the hard coat layer 18 may be selected from polyurethane resin, acrylate resin, epoxy resin, vinyl resin, or silicone resin.

The anti-reflection layer 19 (AR, or anti-reflective) is provided on a side of the hard coat layer 18 away from the second substrate 17. The anti-reflection layer 19 is configured for anti-reflection while preventing scratches. The anti-reflection layer 19 is, for example, an electric conductor film formed on the surface of the hard coat layer 18.

The surface protection layer 20 is configured to protect the film layer underneath. The surface protection layer 20 may be a surface protection layer 20. The surface protection layer 20 may be a transparent resin film formed by one or more selected from thermoplastic resin, e.g., a polyolefin-based resin such as a chain-shaped polyolefin-based resin (such as a polypropylene-based resin or the like), a cyclic polyolefin-based resin (such as norbornene-based resin or the like), or the like; a cellulose ester-based resin such as cellulose triacetate and cellulose diacetate; a polyester-based resin such as polyethylene terephthalate, polyethylene naphthalate, and polybutylene terephthalate; a polycarbonate-based resin; and (meth) acrylic resin; or mixtures, copolymers or the like thereof.

In addition to the above-mentioned film layers, the polarizer 100 may further have another layer such as an antistatic layer, which will not be described one by one herein.

Figure 16:
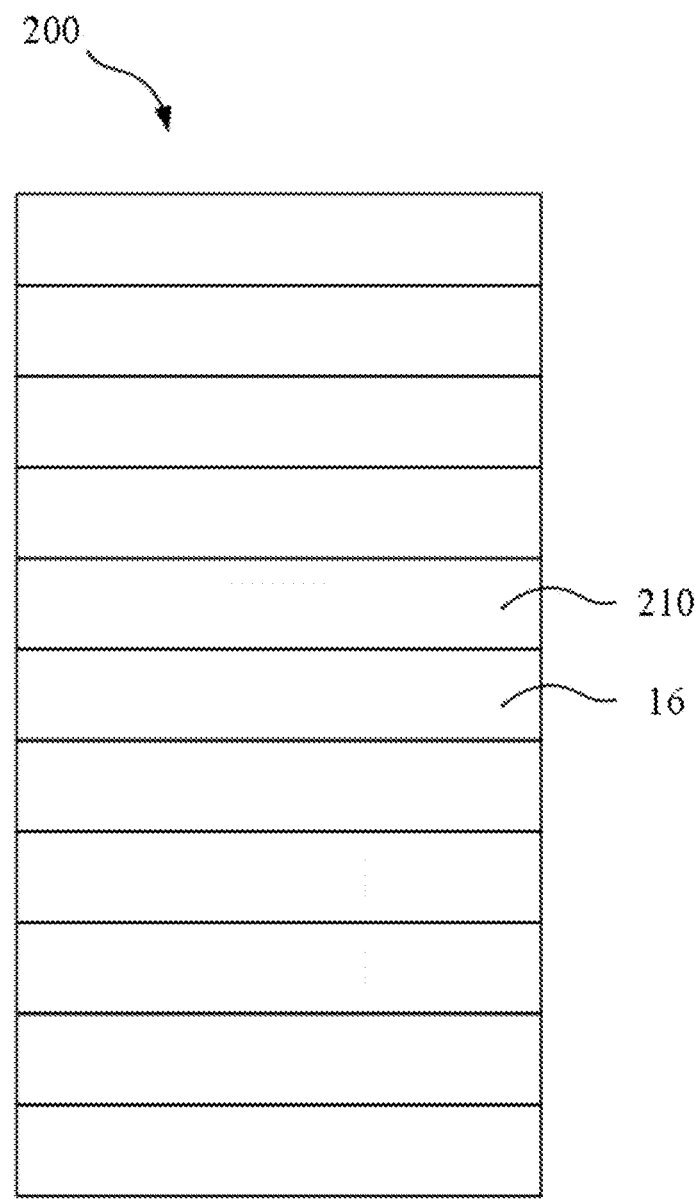
FIG. 16 is a schematic block diagram of a polarizer according to another embodiment of the present application.

A polarizer 200 bonded between the first substrate 15 and the resin layer 210 by using an adhesive layer is shown in FIG. 16. The embodiment with reference to FIG. 16 differs from the embodiment with reference to FIG. 15 in that the whisker 101 is not dispersed in the second pressure-sensitive adhesive layer 16, but is dispersed in an additional resin layer 210 provided on the second pressure-sensitive adhesive layer 16. The material of the resin layer 210 may be selected from a polyurethane resin, an acrylate resin, an epoxy resin, a vinyl resin, and a silicone resin.

According to some implementations of the present application, the polarizer 100 includes a substrate, a polarizing function layer, and a hard coat layer. The substrate is disposed between the polarizing function layer and the hard coat layer. The resin layer may be used as any one of the substrates, the polarizing function layer, and the hard coat layer.

Figure 17:
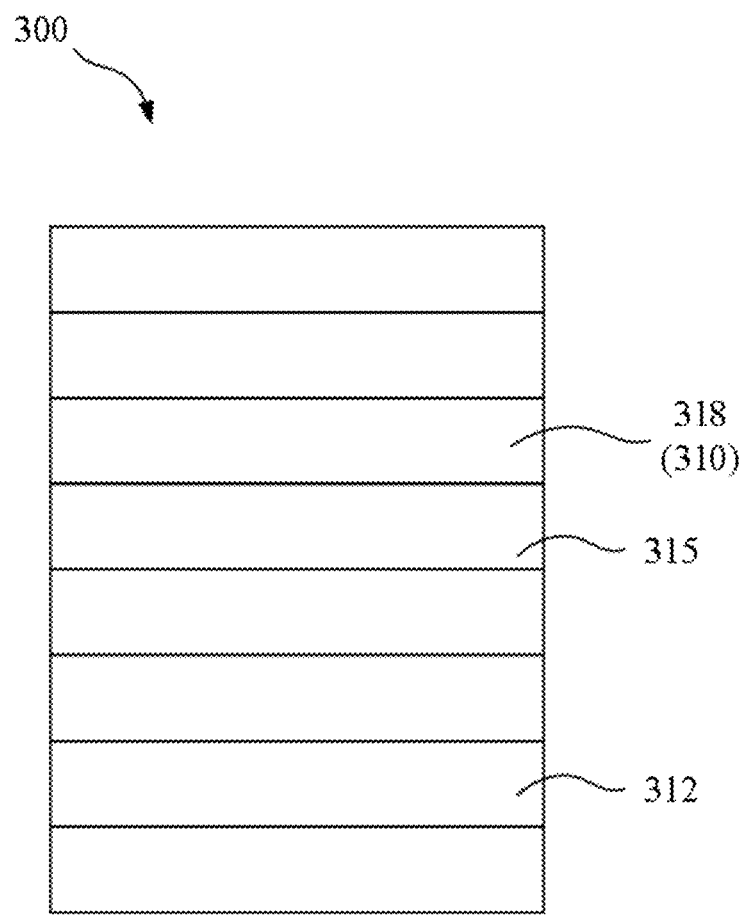
FIG. 17 is a schematic block diagram of a polarizer according to another embodiment of the present application.

A polarizer 300 in which the resin layer 310 is used as the hard coat layer 318 is shown in FIG. 17. The embodiment with reference to FIG. 17 differs from the embodiment with reference to FIG. 15 in that the whisker 101 is not dispersed in the second pressure-sensitive adhesive layer, but is dispersed in the hard coating layer 318. In this embodiment, the second substrate and the second pressure-sensitive adhesive layer may be omitted, and only one substrate 315 and one pressure-sensitive adhesive layer 312 may be provided. By omitting the second base material and the second pressure-sensitive adhesive layer, the structure of the polarizer 100 may be simplified, while the luminance and the contrast ratio of the display panel to which the polarizer is attached are improved by omitting the two base materials.

Figure 18:
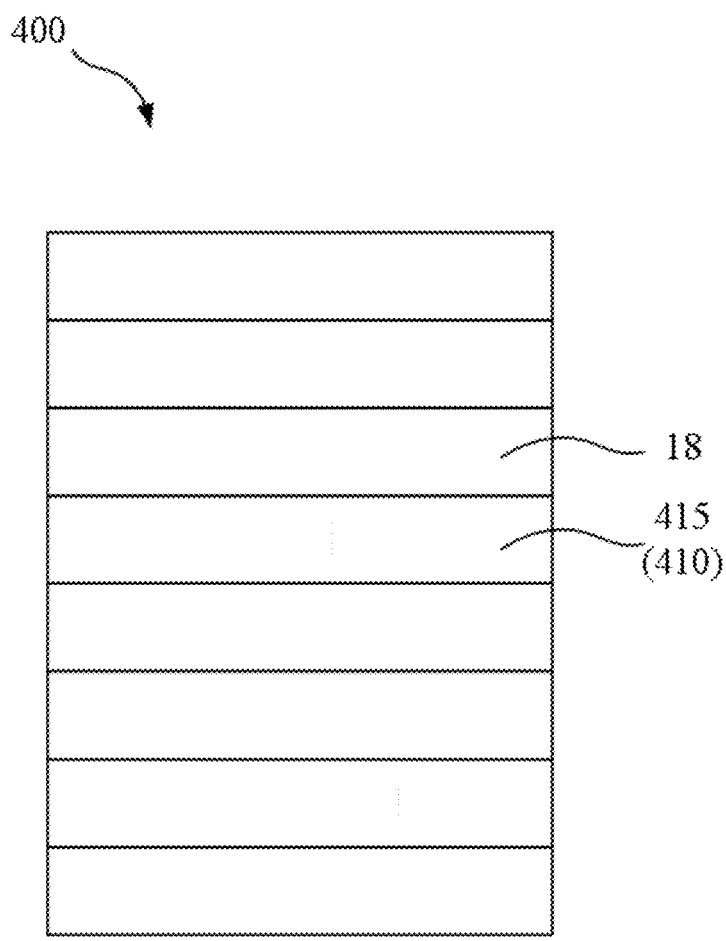
FIG. 18 is a schematic block diagram of a polarizer according to another embodiment of the present application.

An embodiment in which the resin layer 410 is used as the substrate 415 is shown in FIG. 18. The embodiment with reference to FIG. 18 differs from the embodiment with reference to FIG. 17 in that in that the whisker 101 is not dispersed in the hard coat layer 18, but is dispersed in the substrate 415. In this embodiment, only one substrate 415 may be provided. In this structure, both the substrate 415 and the polarizing function layer may be formed in a same stretching process.

Figure 19:
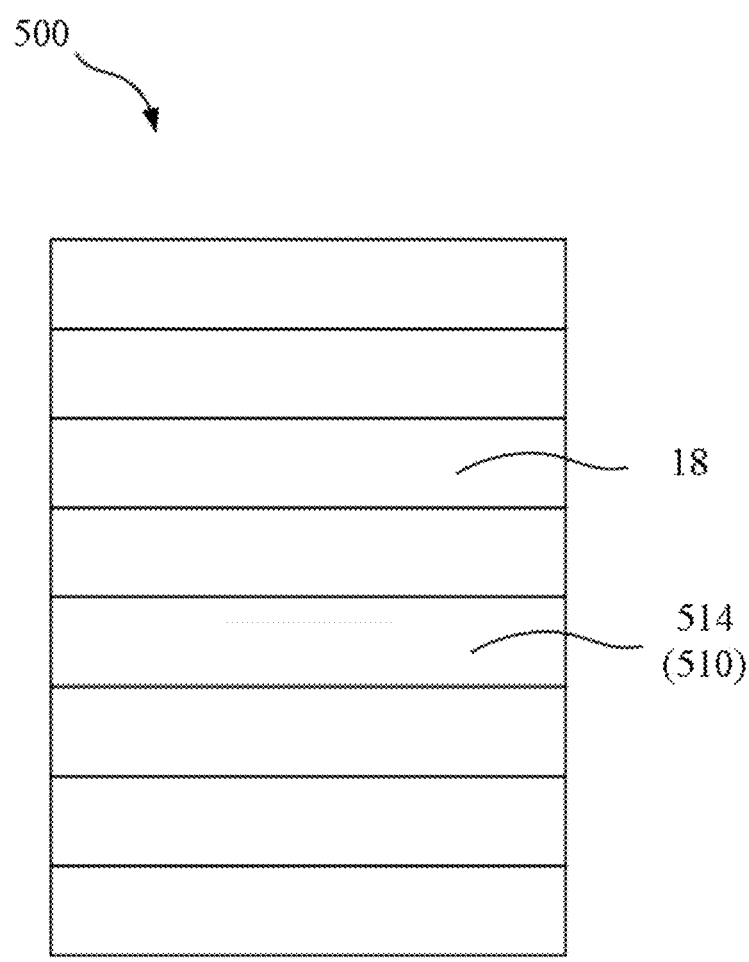
FIG. 19 is a schematic block diagram of a polarizer according to another embodiment of the present application.

An embodiment in which the resin layer 510 is used as the polarizing function layer 514 is shown in FIG. 19. The embodiment with reference to FIG. 19 differs from the embodiment with reference to FIG. 17 in that the whisker 101 is not dispersed in the hard coat layer 18, but is dispersed in the polarizing function layer 514. In this embodiment, only one base material may be provided. In this structure, the polarizing function layer 514 in which the whisker 101 is mixed may be formed by a stretching process.

Figure 20:
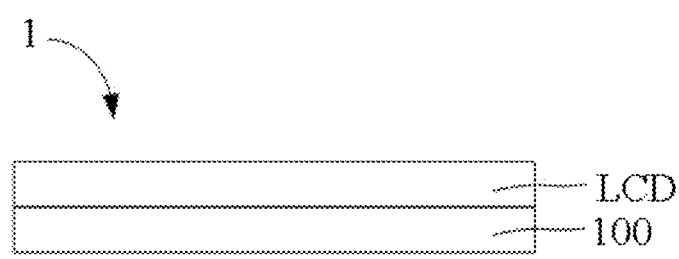
FIG. 20 is a schematic block diagram of a liquid crystal display device according to another embodiment of the present application.

Referring to FIG. 20, the present application further provides a liquid crystal display device 1 including a polarizer 100 and a liquid crystal display panel LCD as described above, the polarizer 100/200/300/400/500 is disposed on a light exiting side of the liquid crystal display panel LCD. That is, the polarizer 100/200/300/400/500 of the present application is used as the upper polarizer of the liquid crystal display device 1. The liquid crystal display device 1 further includes a backlight module, a lower polarizer, or the like provided on the light incident side of the liquid crystal display panel LCD, and a description thereof will be omitted here.

Hereinafter, the improvement of the performance on the viewing angle of a liquid crystal display device disposed with the polarizer according to the present application will be described with reference to the following embodiments.

Embodiment 1

The polarizer as shown in FIG. 15 is manufactured in which the material of the resin layer was an acrylate resin, and the whisker was a calcium carbonate whisker. The whisker has a refractive index n1 of 1.67, a diameter of 1 micrometer to 3 micrometers, and a length L of 10 micrometers to 30 micrometers. The resin layer has a refractive index n2 of 1.49, and a thickness H of 25 micrometers. The ratio of the mass of the whiskers to the total mass of the resin layer (including the whisker and a resin base of the resin layer) is 10%. The resin layer is formed by first dispersing whiskers in a resin composition, forming a first resin layer having a thickness of 5 micrometers by coating, setting an angle of the whisker in the first resin layer, and then forming a second resin layer having a thickness of 20 micrometers on the first resin layer by coating. The resin layer having a total thickness of 25 micrometers is formed by The first resin layer and the second resin layer.

A front projection of the whiskers on the bottom surface of the resin layer is parallel to an absorption axis of the polarizing function layer. An acute angle formed by the long-axis direction of the whisker and the bottom surface of the resin layer is less than or equal to 10°.

It should be noted that the whiskers even formed in the same process do not necessarily have the completely same angles formed by the long-axis directions of the whiskers and the bottom surface of the resin layer. In an embodiment of the present application, the angle formed by the long-axis direction of the whisker and the bottom surface of the resin layer is not limited herein, as long as the angle is in a certain range.

The polarizer is attached as an upper polarizer onto the liquid crystal panel for measuring the optical performance of the polarizer, and the optical performance includes light transmittance, luminance in the bright state, luminance in the dark state, a luminance viewing angle (0.5), or a chrominance viewing angle (0.02).

The luminance measured when the polarizer is viewed in front is taken as the central luminance. The luminance decreases as the viewing angle becomes greater, and when the luminance decreases to half of the central luminance, the viewing angle is taken as the luminance viewing angle (0.5). The chromatic viewing angle (0.02) is the viewing angle at which coordinates x and y of the color coordinate are shifted by 0.02, based on a color coordinate measured when the polarizer is viewed in front. The larger the luminance viewing angle (0.5) and the chrominance viewing angle (0.02), the better the viewing angle effect.

Embodiment 2

The polarizer as shown in FIG. 15 is manufactured in which the material of the resin layer was an acrylate resin, and the whisker was a calcium carbonate whisker. The whisker has a refractive index n1 of 1.67, and a length L of 10 micrometers to 30 micrometers. The resin layer has a refractive index n2 of 1.49, and a thickness H of 25 micrometers. The ratio of the mass of the whiskers to the total mass of the resin layer is 10%. The resin layer is formed by first dispersing whiskers in a resin composition, forming a first resin layer having a thickness of 10 micrometers by coating, setting an angle of the whisker in the first resin layer, and then forming a second resin layer of 15 micrometers on the first resin layer by coating. The resin layer having a total thickness of 25 micrometers is formed by The first resin layer and the second resin layer.

A front projection of the whiskers on a bottom surface of the resin layer is parallel to an absorption axis of the polarizing function layer. An acute angle formed by the long-axis direction of the whisker and the bottom surface of the resin layer is less than or equal to 20°.

Embodiment 3

The polarizer as shown in FIG. 15 is manufactured in which the material of the resin layer was an acrylate resin, and the whisker was a calcium carbonate whisker. The whisker has a refractive index n1 of 1.67, and a length L of 10 micrometers to 30 micrometers. The resin layer has a refractive index n2 of 1.49, and a thickness H of 25 micrometers. The ratio of the mass of the whiskers to the total mass of the resin layer is 10%. The resin layer is formed by first dispersing whiskers in a resin composition, forming a first resin layer having a thickness of 15 micrometers by coating, setting an angle of the whisker in the first resin layer, and then forming a second resin layer of 10 micrometers on the first resin layer by coating. The resin layer having a total thickness of 25 micrometers is formed by The first resin layer and the second resin layer.

A front projection of the whiskers on a bottom surface of the resin layer is parallel to an absorption axis of the polarizing function layer. An acute angle formed by the long-axis direction of the whisker and the bottom surface of the resin layer is less than or equal to 30°.

Embodiment 4

The polarizer as shown in FIG. 15 is manufactured in which the material of the resin layer was an acrylate resin, and the whisker was a calcium carbonate whisker. The whisker has a refractive index n1 of 1.67, and a length L of 10 micrometers to 30 micrometers. The resin layer has a refractive index n2 of 1.49, and a thickness H of 25 micrometers. The ratio of the mass of the whiskers to the total mass of the resin layer is 10%. The resin layer is formed by first dispersing whiskers in a resin composition, forming a first resin layer having a thickness of 20 micrometers by coating, setting an angle of the whisker in the first resin layer, and then forming a second resin layer of 5 micrometers on the first resin layer by coating. The resin layer having a total thickness of 25 micrometers is formed by The first resin layer and the second resin layer.

A front projection of the whiskers on a bottom surface of the resin layer is parallel to an absorption axis of the polarizing function layer. An acute angle formed by the long-axis direction of the whisker and the bottom surface of the resin layer is less than or equal to 40°.

Embodiment 5

The polarizer as shown in FIG. 15 is manufactured in which the material of the resin layer was an acrylate resin, and the whisker was a calcium carbonate whisker. The whisker has a refractive index n1 of 1.67, and a length L of 10 micrometers to 30 micrometers. The resin layer has a refractive index n2 of 1.49, and a thickness H of 25 micrometers. The ratio of the mass of the whiskers to the total mass of the resin layer is 10%. A front projection of the whiskers on a bottom surface of the resin layer is parallel to an absorption axis of the polarizing function layer. An acute angle formed by the long-axis direction of the whisker and the bottom surface of the resin layer is less than or equal to 55°. The resin layer in the Embodiment 5 is formed by a coating process.

The parameters and optical properties of the polarizers of Embodiments 1 to 5 are shown in Table 1 below.

When the orientation angle is less than or equal to 40°, the luminance viewing angle and the chrominance viewing angle are improved significantly compared with those when the orientation angle is less than or equal to 55°, thereby achieving a better display effect. Further, when the orientation angle is reduced to less than or equal to 20°, the luminance viewing angle and the chrominance viewing angle exhibit a significant improvement.

Embodiments 2-1 to 2-5, Comparative Embodiments 2-1 to 2-5

The polarizer as shown in FIG. 15 is manufactured by using the following particle contents. the material of the resin layer was an acrylate resin, and the whisker was a calcium carbonate whisker. The whisker has a refractive index n1 of 1.67, a diameter of 1 micrometer to 3 micrometers, and a length L of 10 micrometers to 30 micrometers. The resin layer has a refractive index n2 of 1.49, and a thickness H of 25 micrometers. The ratio of the mass of the whiskers to the total mass of the resin layer (including the whisker and a resin base of the resin layer) is 10%.

A front projection of the whiskers on a bottom surface of the resin layer is parallel to an absorption axis of the polarizing function layer. An acute angle formed by the long-axis direction of the whisker and the bottom surface of the resin layer is less than or equal to 5°.

It should be noted that L1 refers to the first particle 2, and the diameter of the first particle 2 is unchanged in the length direction of the first particle 2, that is, the first particle 2 is the cylindrical particle. L2 refers to the second particle 3 having a diameter decreasing in the direction from the second end portion D2 of the second particle 3 toward the first end portion D1 of the second particle 3, that is, the second particle 3 is a long cone-shaped particle. L3 refers to the second particle 3 having a diameter gradually decreasing in the direction from the middle of the second particle 3 to the second end portion D2 and in the direction from the middle of the second particle 3 to the first end portion D1, i.e., the second particle 3 is a biconical particle.

Contrast ratio CR refers to the ratio of luminance in the bright state to luminance in the dark state of the display panel. In this test, the luminance of the center of the display

TABLE 1

| Numbering And Parameter Of Embodiment | n2 | n1 | L | H | Range of Orientation Angle Of Whisker | Light Transmittance | Luminance Viewing Angle (0.5) | Chrominance Viewing Angle (0.02) |
|---|---|---|---|---|---|---|---|---|
| Embodiment 1 | 1.49 | 1.67 | 30 um | 5 um + 20 um | Less Than Of Equal To 10° | 4.92% | 152 | 160 |
| Embodiment 2 | 1.49 | 1.67 | 30 um | 10 um + 15 um | Less Than Or Equal To 20° | 4.90% | 150 | 158 |
| Embodiment 3 | 1.49 | 1.67 | 30 um | 15 um + 10 um | Less Than Or Equal To 30° | 4.88% | 139 | 145 |
| Embodiment 4 | 1.49 | 1.67 | 30 um | 20 um + 5 um | Less Than Or Equal To 40° | 4.86% | 135 | 141 |
| Embodiment 5 | 1.49 | 1.67 | 30 um | 25 um | Less Than Or Equal To 55° | 4.83% | 120 | 130 |

As can be seen from Embodiments 1 to 5, as the orientation angle of the whisker decreases, the light transmittance of the polarizer does not change much, but both the luminance viewing angle and the chrominance viewing angle increase with the decrease of the orientation angle.

panel in the bright state and the luminance of the center of the display panel in the dark state were measured.

The chromaticity viewing angle measurement is a viewing angle measurement performed by the CESI standard (CESI0.03).

Some embodiments of the present application will now be described in further detail with reference to a portion of the test results. Refer to Table 2 for details of the test.

TABLE 2

| Numbering/ Parameter Of Embodiment | Mass Ratio of L1, L2, L3 (1) | Total particle content (wt %) | Contrast Ratio CR (1) | Light Transmittance Tr (%) | Chromaticity viewing angle (°) |
|---|---|---|---|---|---|
| Embodiment 2-1 | 5:50:45 | 10 | 2801 | 4.65 | 173 |
| Embodiment 2-2 | 4:51:45 | 10 | 2860 | 4.71 | 169 |
| Embodiment 2-3 | 3:52:45 | 10 | 2904 | 4.76 | 166 |
| Embodiment 2-4 | 2:53:45 | 10 | 2925 | 4.80 | 164 |
| Embodiment 2-5 | 1:54:45 | 10 | 2930 | 4.82 | 163 |
| Comparative Example 2-1 | 0:100:0 | 10 | 3517 | 4.93 | 159 |
| Comparative Example 2-2 | 100:0:0 | 10 | 2762 | 4.63 | 173 |
| Comparative Example 2-3 | 0:100:0 | 7 | 3607 | 4.94 | 151 |
| Comparative Example 2-4 | 100:0:0 | 7 | 2989 | 4.71 | 169 |
| Comparative Example 2-5 | 0:0:100 | 7 | 3674 | 4.95 | 146 |

According to Table 2, in Comparative Example 2-3, Comparative Example 2-4, and Comparative Example 2-5, only the first particle 2 having the constant diameter (i.e., only the cylindrical particle) is provided in the polarizer 100. The contrast ratio of the display panel in each of the above comparative examples is significantly lower than that of the display panel in which only the biconical particle is provided in the polarizer 100 and the display panel in which only the long cone-shaped particle is provided in the polarizer 100. The light transmittance of the display panel in each of the above comparative examples is also slightly lower than that of the display panel in which only the biconical particle is provided in the polarizer 100 and the display panel in which only the long cone-shaped particle is provided in the polarizer 100.

From Table 2, by comparing embodiments 2-1 to 2-5 and Comparative Example 2-1, the chromaticity viewing angle of the display panel provided with the polarizer 100 in which the first particles 2 and the second particles 3 are mixed in the adhesive resin layer 10 is higher than that of the display panel provided with the polarizer 100 in which only the second particles 3 are provided in the adhesive resin layer 10. The display panel provided with the polarizer 100 in which the first particles 2 and the second particles 3 are mixed in the adhesive resin layer 10 has a chromaticity viewing angle of 160° or more. By comparing embodiments 2-1 to 2-5 and Comparative Example 2-1, the contrast ratio and light transmittance of the display panel provided with the polarizer 100 in which the first particles 2 and the second particles 3 are mixed in the adhesive resin layer 10 are both greater than that of the display panel provided with the polarizer 100 in which only the second particles 3 are provided in the adhesive resin layer 10. The display panel provided with the polarizer 100 in which the first particles 2 and the second particles 3 are mixed in the adhesive resin layer 10 has a contrast ratio of 2800 or more and a light transmittance of 4.65% or more. Therefore, the polarizer 100 of the present application has excellent performance and has a good application prospect.

Embodiment 3-1

First, a needle-shaped whisker made of $CaCO_3$ and ultra-pure water were mixed to be a slurry in which the mass fraction of $CaCO_3$ is 6%, sodium stearate is dissolved in absolute ethanol having a mass same as the sodium stearate, and the obtained material is dropped into a calcium carbonate slurry at a temperature of 85° C., so that the mass fraction of sodium stearate was 2%, the obtained slurry is stirred with a stirrer for 1 h, filtered, washed by using ultrapure water and absolute ethanol, and dried at a temperature of 110° C., to obtain the whisker of which the surface is modified by sodium stearate.

The whisker of which the surface is modified by sodium stearate is dissolved in anhydrous ethanol in an equal (mass) proportion, 3% by mass of glycidyl methacrylate and 3.5% by mass of dibromoisobutyryl bromide are dropped into the obtained material in this order, and the obtained solution is stirred at 60° C. for 45 min. Then, 1% by mass of cuprous bromide is dropped as a catalyst, 3% by mass of pentamethyldiethylenetriamine (PMDETA) is dropped, and the obtained solution is stirred at constant temperature of 60° C. for 80 min, filtered, washed by using ultrapure water and absolute ethanol, and dried at a temperature of 110° C., to obtain the polymer-modified whisker of which polyglycidyl-methacrylate is bond to the outer surface.

The polymer-modified whisker is doped at a mass fraction of 6% in an adhesive material for forming the second pressure-sensitive adhesive layer, to form a resin composition. The resin layer is formed on the surface of the first protection layer by using the resin composition. The resin layer has a thickness of 20 micrometers, and the structure of the polarizer was shown in FIG. 15.

Comparative Example 3-1

Different from Embodiment 3-1, the obtained whisker of which the surface is modified by sodium stearate is doped at a mass fraction of 7% in an adhesive material for forming the second pressure-sensitive adhesive layer, to form a comparative resin composition. The comparative resin layer is formed on the surface of the first protection layer by using the comparative resin composition. The comparative resin layer had a thickness of 25 micrometers, thereby obtaining a comparative polarizer. The structure of the comparative polarizer may be same as or similar to that of the polarizer obtained in Embodiment 1, except that in the comparative polarizer, the resin layer was replaced with the comparative resin layer.

The polarizers obtained in Embodiment 3-1 and Comparative Example 3-1 were respectively provided on the light exiting sides of the same type of liquid crystal display modules (including the same liquid crystal display panels, the same backlight modules, and the polarizers of the same structure and each located between the liquid crystal display panel and the backlight module), thereby obtaining the chromaticity viewing angle, the light transmittance, and the yield of the obtained polarizers as shown in Table 3.

TABLE 3

| Numbering/ Parameter Of Embodiment | Amount Of Particles | Optimal Film Thickness | Chromaticity viewing angle | Light Transmittance | Yield |
|---|---|---|---|---|---|
| Comparative Example 3-1 | 100% | 100% | 100% | 100% | 100% |

TABLE 3-continued

| Numbering/ Parameter Of Embodiment | Amount Of Particles | Optimal Film Thickness | Chromaticity viewing angle | Light Transmittance | Yield |
|---|---|---|---|---|---|
| Embodiment 3-1 | 85.7% | 80% | 100% | 107% | 102% |

From Table 3, as compared to the whisker of which the surface has been modified by sodium stearate, the polymer-modified whiskers formed by attaching a polymer to the surface of the whisker of which the surface has been modified by sodium stearate may improve the dispersibility of the polymer-modified whisker and reduce aggregation in the resin layer due to the polymer attached to the surface of the whisker, so that under the same degree of chromaticity viewing angle, the amount of particles is reduced, the light transmittance of light of the display device is improved, and the product yield is also improved.

The foregoing has provided a detailed description of embodiments of the present application, and some embodiments have been used herein to illustrate the principles and implementations of the present application. The foregoing description of embodiments is provided merely to assist in understanding the present application. At the same time, variations will occur to those skilled in the art in both the detailed description and the scope of the present application in accordance with the teachings of the present application. In view of the foregoing, the present description should not be construed as limiting the application.

What is claimed is:

1. A polarizer comprising a resin layer, wherein the resin layer comprises whiskers, an acute angle is formed by a long-axis direction of each of the whiskers and a bottom surface of the resin layer, and the acute angle is greater than 0° and less than or equal to 40°;
the whiskers comprise first particles and second particles, each of the first particles has a diameter constant in a length direction of the first particle;
the second particles comprise first-type particles and second-type particles, each of the first-type particles and the second-type particles comprises a first end portion and a second end portion arranged in a length direction thereof;
a diameter of each of the first-type particles decreases in a direction from the second end portion of the first-type particle toward the first end portion of the first-type particle;
a diameter of each of the second-type particles increases and then decreases in a direction from the second end portion of the second-type particle toward the first end portion of the second-type particle; and
a ratio of mass of all the first particles, mass of all the first-type particles, and mass of all the second-type particles is (1 to 10):(40 to 70):(20 to 60).

2. The polarizer of claim 1, wherein the acute angle is less than or equal to 20°.

3. The polarizer of claim 2, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

4. The liquid crystal display device of claim 3, wherein the second polymer comprises a group same as one of a group of the first polymer and a group of a homologue of the first polymer; or
the second polymer comprises at least one of polyacrylate group, acrylate-acrylic acid copolymer group, polycarboxylic acid-type water-soluble comb copolymer group, or polydimethylsiloxane group.

5. The polarizer of claim 1, wherein a ratio of a sum of mass of the first particles and mass of the second particles to mass of the resin layer is 10%.

6. The polarizer of claim 5, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

7. The liquid crystal display device of claim 6, wherein the second polymer comprises a group same as one of a group of the first polymer and a group of a homologue of the first polymer; or
the second polymer comprises at least one of polyacrylate group, acrylate-acrylic acid copolymer group, polycarboxylic acid-type water-soluble comb copolymer group, or polydimethylsiloxane group.

8. The polarizer of claim 1, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

9. The polarizer of claim 8, wherein the second polymer comprises a group same as one of a group of the first polymer and a group of a homologue of the first polymer; and
the second polymer further comprises at least one of polyacrylate group, acrylate-acrylic acid copolymer group, polycarboxylic acid-type water-soluble comb copolymer group, or polydimethylsiloxane group.

10. The polarizer of claim 8, wherein the second polymer comprises a group same as one of a group of the first polymer and a group of a homologue of the first polymer, or the second polymer comprises at least one of polyacrylate group, acrylate-acrylic acid copolymer group, polycarboxylic acid-type water-soluble comb copolymer group, polydimethylsiloxane group.

11. A liquid crystal display device comprising the polarizer of claim 1.

12. The liquid crystal display device of claim 11, wherein the acute angle is less than or equal to 20°.

13. The liquid crystal display device of claim 12, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

14. The liquid crystal display device of claim 13, wherein the second polymer comprises a group same as one of a group of the first polymer and a group of a homologue of the first polymer; or
the second polymer comprises at least one of polyacrylate group, acrylate-acrylic acid copolymer group, polycarboxylic acid-type water-soluble comb copolymer group, or polydimethylsiloxane group.

15. The liquid crystal display device of claim 11, wherein a ratio of a sum of mass of the first particles and mass of the second particles to mass of the resin layer is 10%.

16. The liquid crystal display device of claim 15, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

17. The liquid crystal display device of claim 16, wherein the second polymer comprises a group same as one of a group of the first polymer and a group of a homologue of the first polymer; or the second polymer comprises at least one of polyacrylate group, acrylate-acrylic acid copolymer group, polycarboxylic acid-type water-soluble comb copolymer group, or polydimethylsiloxane group.

18. The liquid crystal display device of claim 11, wherein the resin layer further comprises a first polymer, the whiskers are dispersed in the first polymer, and a second polymer is attached to a surface of each of the whiskers, and wherein the first polymer is a lipophilic polymer and the second polymer is a lipophilic polymer.

19. The liquid crystal display device of claim 18, wherein the second polymer comprises a group same as one of a group of the first polymer and a group of a homologue of the first polymer; and the second polymer further comprises at least one of polyacrylate group, acrylate-acrylic acid copolymer group, polycarboxylic acid-type water-soluble comb copolymer group, or polydimethylsiloxane group.

20. The liquid crystal display device of claim 18, wherein the second polymer comprises a group same as one of a group of the first polymer and a group of a homologue of the first polymer, or the second polymer comprises at least one of polyacrylate group, acrylate-acrylic acid copolymer group, polycarboxylic acid-type water-soluble comb copolymer group, polydimethylsiloxane group.

* * * * *